US005193058A

United States Patent [19]

Bassili et al.

[11] Patent Number: 5,193,058

[45] Date of Patent: Mar. 9, 1993

[54] METHOD AND APPARATUS FOR THE MEASUREMENT OF RESPONSE TIME IN ATTITUDE SURVEY RESEARCH

[75] Inventors: John N. Bassili; Joseph F. Fletcher, both of Toronto, Canada

[73] Assignee: Arkelon Research, Streetsville, Canada

[21] Appl. No.: 603,645

[22] Filed: Oct. 26, 1990

[51] Int. Cl.[5] .......... G06F 15/38; G09B 5/04; G09B 7/00; H04N 7/00

[52] U.S. Cl. .......... 364/419; 434/321; 434/335; 358/84

[58] Field of Search .......... 364/419; 358/84, 85; 379/89, 90, 91, 92, 93, 94, 95, 96; 434/320, 321, 322, 323, 335, 365, 325; 455/2

[56] References Cited

U.S. PATENT DOCUMENTS

| | | | |
|---|---|---|---|
| 4,439,161 | 3/1984 | Wiggins et al. | 434/335 |
| 4,447,212 | 5/1984 | Swift et al. | 434/321 |
| 4,464,124 | 8/1984 | Romero et al. | 434/321 |
| 4,643,682 | 2/1987 | Migler | 434/335 |
| 4,745,468 | 5/1988 | Von Kohorn | 358/84 |
| 4,788,716 | 11/1988 | Zebe | 379/92 |
| 4,845,739 | 7/1989 | Katz | 379/67 |
| 4,922,520 | 5/1990 | Bernards et al. | 379/92 |
| 5,034,807 | 7/1991 | Von Kohorn | 358/84 |

*Primary Examiner*—Roy N. Envall, Jr.
*Assistant Examiner*—Xuong Chung
*Attorney, Agent, or Firm*—Bereskin & Parr

[57] ABSTRACT

A method is provided for conducting an opinion survey in which a question is posed to a person being surveyed and a timing means is started at the end of the question. The timing means is stopped upon commencement of the person's response and the person's response is recorded. The method further includes the step of evaluating the validity of the starting and stopping of the timing means and may further include the step of evaluating and recording the quality of the audio response which stopped the timing means to monitor the validity of the measured response time. An apparatus is also provided for use in survey research. The apparatus has a means for displaying a menu of questions to be asked to the person conducting the survey. The apparatus also includes a means for electronically or manually starting a timing apparatus upon completion of the question and a means for converting the first audio response from a person being surveyed into an electronic signal which stops the timing means to record the time taken to respond.

6 Claims, 4 Drawing Sheets

METHOD AND APPARATUS FOR THE MEASUREMENT OF RESPONSE TIME IN ATTITUDE SURVEY RESEARCH

FIELD OF THE INVENTION

This invention relates generally to the field of survey research which includes the fields of market research, new product research, and political attitude research of a type conducted by public opinion pollsters, as well as other types of survey research. In particular, this invention relates to the type of surveys which are conducted by random interviews, such as telephone interviews, with members of a broad or specialized population with a view to determining prevailing attitudes.

BACKGROUND OF THE INVENTION

Survey research has been known and used extensively in the past as a means of social inquiry. By asking questions and recording responses society has learned much about its own political and social attitudes, consumer preferences, population characteristics, employment levels, agricultural production, and a wide range of other topics. While such surveys are very useful, the data collected typically are far from perfect. One particular shortcoming has more recently become apparent. The shortcoming is that while conventional survey research practice is well adapted to reveal the opinions of representative samples of respondents, such practices provide little or no data on the processes by which respondents arrive at their opinions. Consequently it is extremely difficult to determine on the basis of traditional methods whether the response is based on an actual attitude or whether it is fabricated on the spot for the purpose of providing an answer. In the former case, it is common to think of the attitude as being pre-integrated and crystallized and thus quite stable, whereas in the latter case the response represents an improvisation which is susceptible to change.

What is desired is an improved method and apparatus for conducting surveys which provides data which can be used to predict more accurately the degree of crystallization of a person's attitudes. Such a method and apparatus would preferably be useful in association with telephone surveys of the type in which a trained surveyor poses questions to a respondent based on a menu of questions provided by a computer program. Also, preferably such a method and apparatus would be transparent from the perspective of the respondent.

BRIEF SUMMARY OF THE INVENTION

According the present invention there is provided a method of conducting an opinion survey comprising:

a) posing a question to a person being surveyed;
b) starting a timing means at the end of the question;
c) stopping the timing means upon commencement of the person's response;
d) recording the person's response; and
e) evaluating the validity of starting and stopping of the timing means.

According to another aspect of the present invention there is provided an apparatus for use by an interviewer in conducting a survey of a person, the apparatus comprising: means for displaying a menu of questions to be asked by interviewer, said means for displaying including timing means, said means for displaying comprising a computer having a central processing unit, a disk drive, a data entry keyboard and a video display unit, and means for providing question prompts to the interviewer asking questions of the person being surveyed by displaying said question prompts on the video display unit; means for initiating said timing means upon completion of the question, said means for initiating being coupled to said means for displaying, and said means for displaying being responsive to said means for initiating, and said means for initiating being responsive to a manual input from the interviewer and an electronically activated input for generating a control signal for initiating said timing means in response to one of said manual and electronically activated inputs; means for detecting an audio response from the person being surveyed and converting said audio response into an electronic control signal which stops the timing means, said means for detecting and converting being coupled to said means for displaying; and said means for displaying, determining and recording a response time of the person being surveyed being based on the initiating and stopping of said timing means.

DETAILED DESCRIPTION OF A PREFERRED EMBODIMENT

Figure 1:
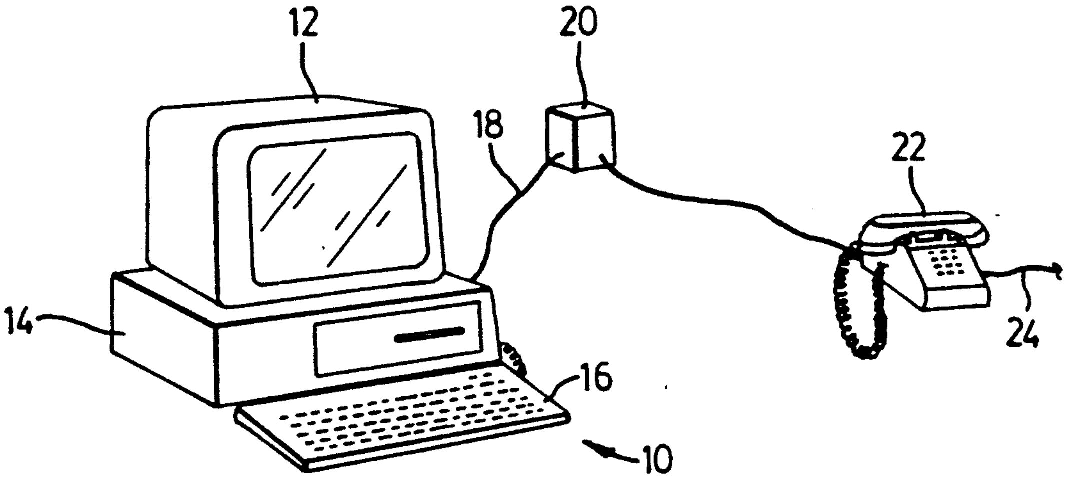
FIG. 1 shows in block diagrams an apparatus according the present invention.

FIG. 1 shows a preferred embodiment of the apparatus indicated generally as 10 which is preferred in association with the method of the instant invention. The apparatus 10 is comprised of a video display screen 12, a computer 14 with associated keyboard 16. An input wire 18 provides input from a timing means which comprises, in the preferred embodiment, a voice keyed timing circuit 20 connected between the computer 14 and a telephone 22. The telephone 22 would be hooked up in an ordinary manner to a telephone network via a cable 24. The circuit 20 would be connected in the manner described below.

Figure 2:
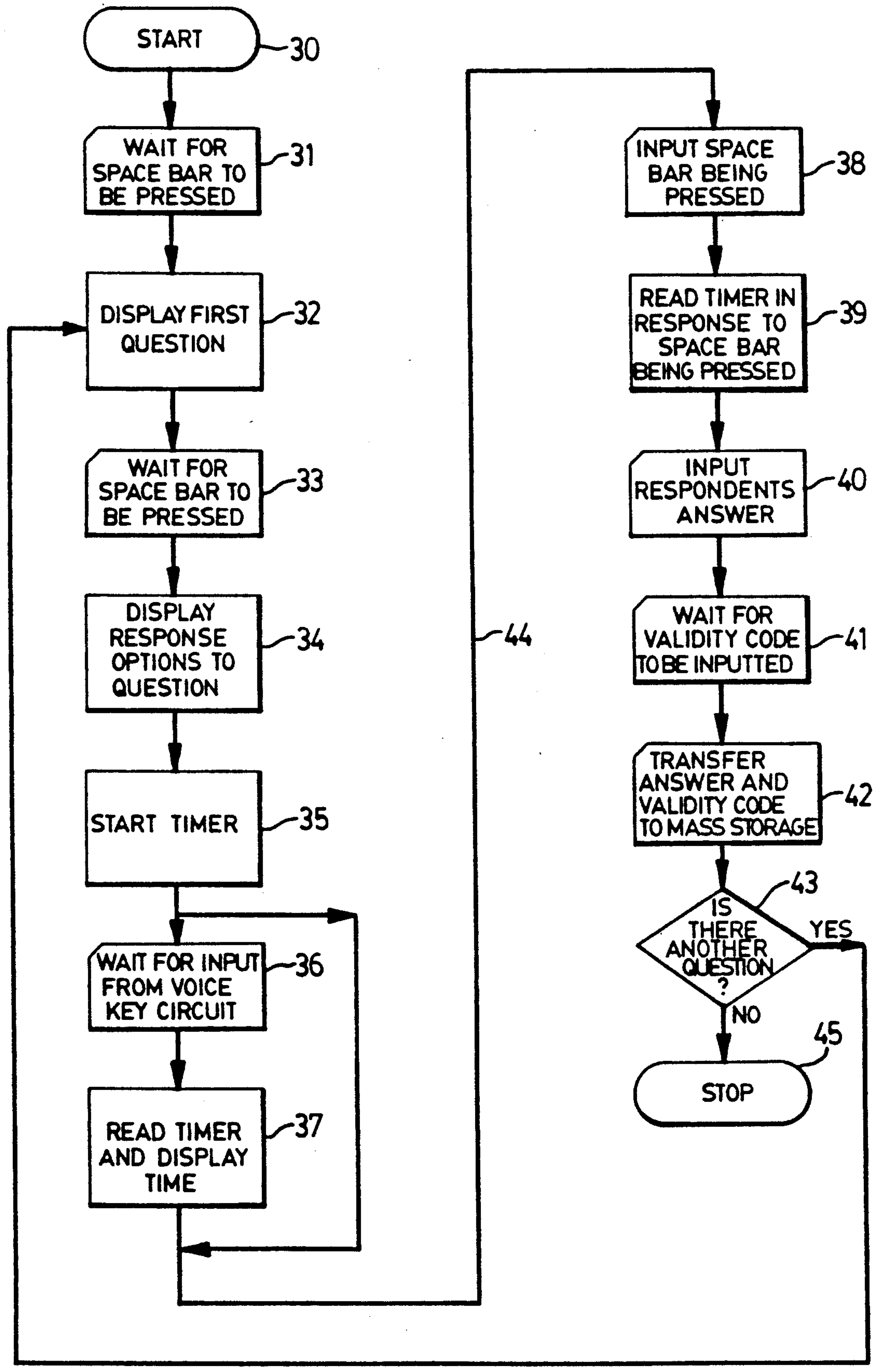
FIG. 2 shows a flow chart for a software program for use on the computer of FIG. 1.

One embodiment of a suitable flowchart for a software program is illustrated in block diagram form in FIG. 2. The shape of the flowchart blocks follows convention in that an oval represents a terminal, a rectangle with the upper left corner missing is an input or output, a rectangle is a processing step, a diamond is a decision step and the arrows indicate the flow of the program. Implementing the software program 10 to execute the method steps in FIG. 2 is routine and well within the capability of any person skilled in the art of computer programming. Implementing the steps of FIG. 2 is illustrated below using the well known and popular BASIC programming language. The computer is turned on and the program is initiated in a normal fashion which is indicated by start step 30. Once the computer is operational, the interviewer begins by hitting the spacebar of the keyboard which is noted as first input step 31. For example, in BASIC the programmer would use a 'DO loop' which "loops" until the spacebar is pressed. If the program uses the spacebar more than once, the DO loop can be conveniently coded using the well-known programming structure of a subroutine which is invoked using a standard subroutine call This causes the first question to be displayed which is output step 32. Displaying the question in BASIC, simply involves using a PRINT statement to print the question on the display screen 12. In known manner, the question can be stored as a character string. The interviewer then makes verbal contact with the person to be surveyed, hereinafter called the respondent. Then the question on the screen is put to the respondent by the interviewer. The question will contain a number of response options. Thereafter, the spacebar is hit again at input step 33 and a number of response options are displayed on the screen as output step 34. Like in step 32, displaying the options can be implemented using BASIC's PRINT statement. The clock is also initialized which is shown as processing step 35 and begins to count time in 1000ths of a second. The timer can be implemented as a subroutine which in known manner periodically increments or decrements a variable. The timer is initialized by passing the value of the variable to the timer subroutine Upon the first audio response, the telephone speaker emits a signal which triggers the timing circuit 20, shown as voice key input 36, which in turn prompts a clock reading and a signal to appear on he screen shown as processing step 37. The program prompts a clock reading by waiting for the voice key input 36, by using the well-known expedient of a DO loop as in step 31 above Additionally, the interviewer also hits the spacebar shown as input 38 which causes the clock to be read as processing step 39. This step can be implemented in BASIC as a DO loop (which itself can be contained in a subroutine). The DO loop waits or loops until the spacebar to be pressed. In cases where the interviewer detects an answer not detected by the voice key, the program bypasses steps 36 and 37.

The interviewer then codes the respondent's answer shown as input 40. The next step is to input the validity code of audio response shown as input 41. As for the spacebar input, step 41 can be implemented as a simple DO loop which waits for an input (e.g. from the keyboard) corresponding to the validity code. Preferably, the program also then automatically logs the data onto the hard disk as output 42. The program then searches to determine if a further question remains at decision step 43 and in the event that a further question remains to be asked, the program will repeat the foregoing sequence as shown by flow arrow 44. Step 43 can be implemented in BASIC simply as a WHILE DO loop which decrements a question counter. The loop is exited after the last question has been posed. In the event no more questions remain, the next step is to stop, shown at 45.

Figure 3:
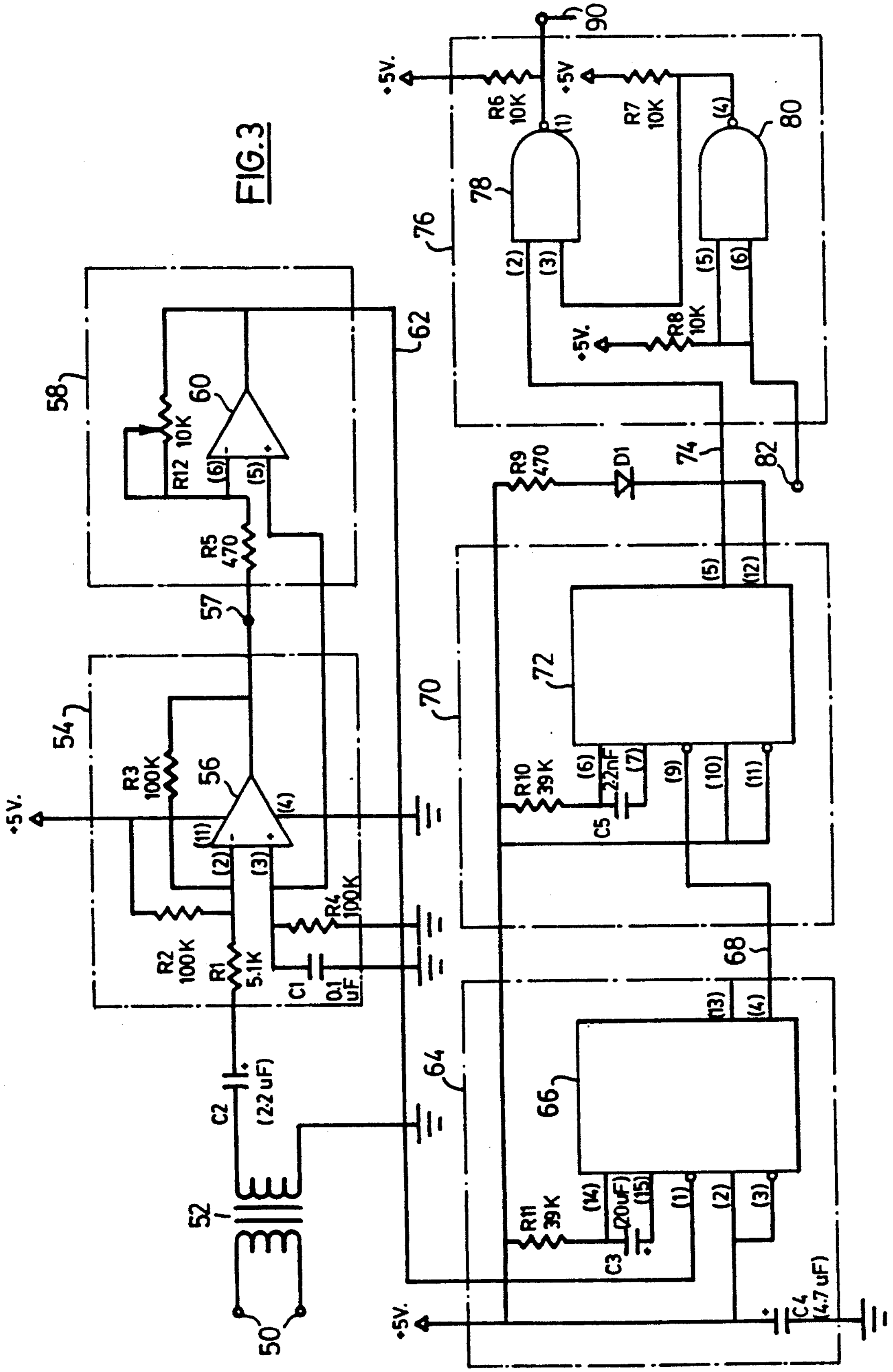
FIG. 3 shows an embodiment of a timing circuit of FIG. 1.

FIG. 3 shows the voice key circuit 20 of the preferred embodiment as purchased from Act Enterprises. Typical values of components in FIG. 3 are shown in parentheses in the drawing. Pin numbers of integrated circuits are also shown in parentheses. The voice key circuit 20 is constructed and operates in the following manner.

The audio signal from the telephone earpiece (not shown in FIG. 3) is connected via terminals 50 to the primary winding of 600 ohm isolating transformer 52 which prevents spikes on the telephone line from destroying the FIG. 3 circuit. The signal from the secondary winding of transformer 52 is coupled through a DC blocking capacitor C2 to an input buffer and level shifter stage 54. Stage 54 includes a conventional audio amplifier 56 (typically Model LM324 made by National Semiconductor) having at its output 57 a DC offset voltage of 2.5 volts set by resistors R2 and R4. The gain of the stage 54, set by feedback resistor R3, is fixed at 20 which is relatively low, to reduce noise effects.

The output 57 of stage 54 is connected to a variable gain stage 58. Stage 58 is used to set the trigger level for the voice key as will be described. Stage 58 includes another audio amplifier 60, again typically Model LM324 made by National Semiconductor, the gain of which can be adjusted from 0 to 20 by variable resistor R12.

The output of variable gain stage 58, on line 62, again has a 2.5 volt DC offset to ensure that the audio level is centred. The output of gain stage 58 is connected via line 62 to a primary one-shot stage 64. Stage 64 includes a one-shot chip 66, typically part of Model 74LS221 made by Motorola or National Semiconductor. When the chip 66 receives a trigger pulse on pin 1 from line 62, the chip produces a pulse at pin 4. The width of the pulse, which is approximately one second, is controlled by resistor R11 and capacitor C3 connected to pins 14 and 15 of the chip. The one second time period is chosen so that there is a "dead zone" after each trigger pulse. The dead zone ensures that only one pulse will be generated.

The one-second pulse output on pin 4 of chip 66 is directed via line 68 to a keyboard simulator stage 70. Keyboard simulator stage 70 also includes a one-shot 72, typically part of chip model number 74LS221 made by Motorola or National Semiconductor.

The pulse on line 68 is directed to pin 9 of chip 72 and triggers another pulse of duration 0.1 second on pin 5 of chip 72. The duration of this pulse is set by resistor R10 and capacitor C5. This duration simulates the action of pressing a key on the computer keyboard 16. The pulse also appears at pin 12 to blink a light emitting diode (LED) D1 which acts as a visual indicator to the operator.

The pulse at pin 5 of chip 72 is output on line 74 to a driver stage 76, and in particular to an open collector NAND gate 78 therein. The gate 78 is an open collector gate so as not to interfere with the normal operation of keyboard 16. Gate 78 is typically part of Model 74LSO1 made by Motorola or National Semiconductor.

Stage 76 also contains another NAND gate 80, also part of Model 74LSO1 by Motorola or National Semiconductor. Gate 80 has its pin 6 connected to line 82 on which the matrix scan-out for the minus key of the keyboard 16 appears.

The other input (pin 5) of gate 80 is connected to plus 5 volts through resistor R8. When the minus key on the keyboard 16 is scanned, the output at pin 4 of gate 80 will go high, causing a high input at pin 3 of NAND gate 78. If pin 2 of gate 78 is high at this time due to a 0.1 second pulse from stage 70, then the output at pin 1 of gate 78 will go low. Pin 1 of gate 78 is connected to the matrix scan-in line 90 for the minus key of keyboard 16. A low signal at pin 1 of gate 78 therefore simulates to the keyboard a key press on the minus key. As discussed above, this prompts a clock reading shown as processing step 37 in FIG. 2. In other words, it has the same result as that achieved when the interviewer hits the space bar shown as input 38 in FIG. 2. The foregoing arrangement was used in the following experiment.

EXAMPLE 1

An interview was conducted by a male interviewer who was familiar with the technical aspects of the apparatus. The interviewer was not familiar with the hypothesis relating the work so the interviewer should not have affected the results by a conscious or unconscious bias.

The survey was administered over the telephone using the above described computer assisted interviewing procedure. A random sample of university students was selected from the student telephone directory. Four hundred and ten local telephone numbers were selected for the sample, and 246 completions were recorded for an overall response rate of 60%.

The time between the end of the question and the response was measured for all questions in the survey. Upon reading the last word of the question, the interviewer pressed the spacebar on the computer keyboard which triggered the onset of the computer clock to keep time to the nearest 1000th of a second. Sound signals coming over the ear piece of the telephone were monitored by a voice key circuit 20 as described above, and also by the interviewer. The voice key was connected to the computer so the first sound emitted by the respondent prompted a signal which caused the computer to read the computer clock. Preferably, the computer screen indicates to the interviewer that the clock has been read upon the action of the voice key circuit. Additionally, in the example, the interviewer independently took note of the beginning of the respondent's answer by pressing the spacebar which effected a separate reading of the computer clock.

The interviewer then entered the substance of the answer given by the respondent and also coded the validity of the response time measurements. Five categories were used in the coding of the validity of both (i.e. automatic and manual) time measures.

1. Both valid
2. Both invalid
3. Where there is a valid interviewer recording but an invalid voice key circuit 20 reading which arose because of a) hem-haw, line noise or miss; b) if the respondent responded with a question; or c) the respondent answered prior to the end of the interviewer's question.

In the example survey, the voice key circuit yielded valid measurements on 53.3% of all responses to the questionnaire. In 13% of the trials, the respondent asked for clarifications before giving an answer and in 0.3% of the trials the respondent gave the answer before the end of the question. In 32.3% of the trials an invalid voice key signal was coded but it is believed that this degree of invalidity can be improved somewhat. However, there will always be a certain degree of invalid voice key signals by reason of what may be called audible hesitation, such as hemming and hawing from a respondent.

As the interviewer also manually caused a response time reading, it was possible to compare the interviewer's response time with the voice key response time for those cases where both were valid. The average correlation between voice key and interviewer latencies across the survey's attitude questions was r=0.94 ranging between r=0.99 and r=0.85. These high indexes of agreement suggest the interviewer and the voice key kept time reliably. However, subsequent analysis revealed that interviewer latencies suffer from a weakness in comparison to voice key latencies. The problem stems from the temporal increment introduced by the interviewer. On average, for attitude questions where the voice key yielded valid latencies the increment was 0.607 seconds ranging among the questions from between 0.458 seconds and 0.930 seconds. Because the variance of latencies scores closely correlates with the mean, and because the increment introduced by the interviewer accounts for a measurable (i.e. non-negligible) portion of the latency scores, interviewer latencies are statistically less powerful than voice key latencies. Thus, while the interviewer latencies may be used to obtain similar results the degree of statistical certainty of such results is very much diluted as discussed below.

Three types of questions were asked in the course of the survey. Some questions were purely factual, such as inquiring about the respondent's year in college, their major, and their religion. Other questions sought the respondents' endorsement of values, such as equal opportunity for men and women, and advancement based upon merit. Finally, the most complex question put those values in conflict.

The three simplest factual questions had the following mean response time for valid voice key trials:

Year in college; M=0.505 seconds
Their major; M=0.582 seconds
Their religion; M=0.974 seconds More complex factual questions such as how often do you attend your place of worship M=1.270 seconds or how far did your father go in school M=1.340 seconds took longer to answer than the simple self relevant factual questions.

The value relevant questions included in the survey provided a good index of the latencies associated with the expression of attitudes. These latencies range from 1.382 seconds (do you think in a fair economic system all people should earn about the same or people with more ability should earn higher salaries? ) to a high of 2.079 seconds (the poor are poor because they don't try hard enough to get ahead or because the wealthy and powerful keep them poor? ). A question which placed values in conflict which is described in more detail below took longer to answer than any of the straight value questions (M=2.204 seconds). These results make it clear that there is a progression in response latencies that corresponds to the complexity of the judgments required by the questions.

Figure 4:
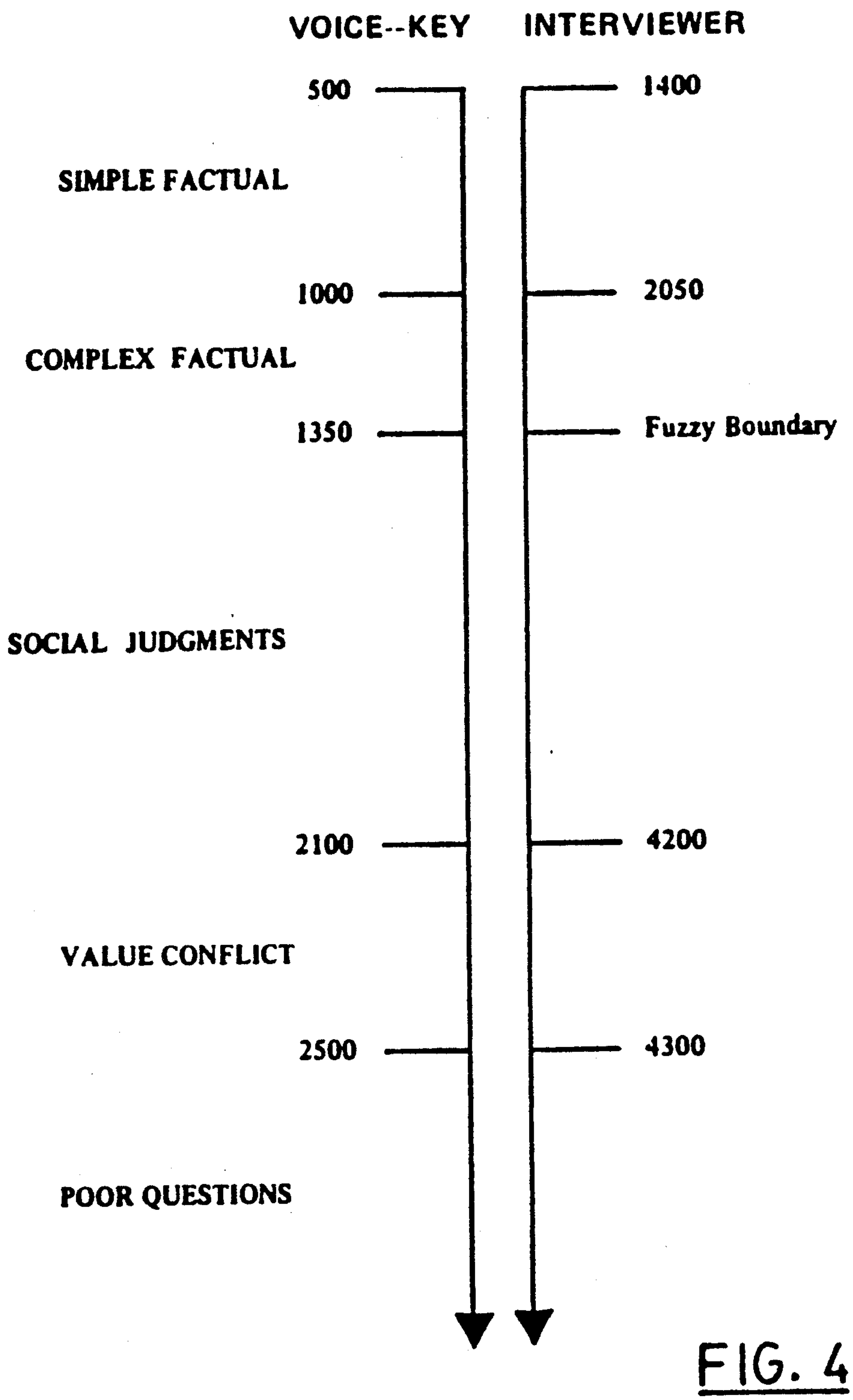
FIG. 4 shows timed response parameters.

FIG. 4 shows the timed response parameters which were measured in the experiment. The length of time to respond is shown in milliseconds and the voice key circuit measured time is shown on the left side of the chart, and the interviewer's timed response is shown on the right.

One interesting result of measuring the response time is that it is possible to identify poor or invalid questions, by the nature of the response time. For example, two questions in the example survey were asked which had much longer response times than would be anticipated based upon the other results. The questions were: "We should not be tolerant of ideas that are morally wrong" (M=3.256 seconds) and "This country would be better off if it worried less about how equal people are"

(M=2.388 seconds). The first question is a question posed in the negative and is thus more difficult to answer. Further, the question is vague in identifying the meaning of "morally wrong ideas" which also makes it difficult to answer. The second question is difficult to answer because of the tension between the concept of "better" and that of "worrying less". The long response times measured for these questions indicates that mere comprehension of the questions was difficult.

It will be appreciated by those skilled in the art that the time taken to answer a question will contain two main temporal elements. The first element is one of question comprehension, or, how long does it take before the respondent understands the question being asked. The second portion comprises formulating an answer and verbalizing the answer, or, once the question is understood how long it takes to respond by answering. The method and apparatus of the present invention do not enable one to identify each portion separately. However, in measuring the total it is possible to identify those questions which create a comprehension problem. Thus, the present invention may be usefully used to improve surveys by testing for and identifying those questions which are unsuitable by reason of the question comprehension problems inherent in the formulation of the question.

In summary, the latencies associated with various types of questions in survey research appear to be quite orderly. In the study, simple questions about salient facts took less than one second to answer. Questions about facts that are less salient or that require a simple frequency estimate take between 1.0 and 1.4 seconds to answer. Simple attitude questions take between 1.4 and 2.0 seconds and more complex attitude questions take between 2.0 and 2.6 seconds. Beyond this, it appears that questions that are flawed in their construction may take a fair bit more time to answer.

The results of the foregoing experiment were analyzed with a view to determining the degree of crystallization of attitudes. This was accomplished by asking a question that raises a conflict between two values and depending upon the response confronting the respondent with an argument running counter to the view they just expressed in the very next question. Thus, the question "Do you think that large companies should have quotas to ensure a fixed percentage of women are hired or should women get no special treatment?" raises a conflict between the two values; namely the value of equality, which is promoted by quotas, and the value of merit which is undermined by them. Thus, respondents who supported quotas were next asked if they would feel the same even if this meant not hiring the best person for the job. Conversely, respondents who opposed quotas were next asked if they would feel the same even if it meant that women would remain economically unequal.

A key test was conducted to compare the voice key latencies of people who changed their preferences (movers) and those who maintained them (non-movers) It revealed that non-movers gave their answers significantly faster than movers ($M=1.744$ and $M=2.779$ seconds respectively, $t(89)=2.69$, $P<0.01$. It is believed therefore that the difference in time taken by movers and non-movers to answer the quotas question is consistent with the degree of attitude crystallization of the respondent.

Additional evidence supports the foregoing conclusion. The average response time for non-movers was 1.744 seconds to answer the conflicting quotas question. This time span fits comfortably within the range of the time for simple attitude questions. By contrast, movers took an average of 2.779 seconds to report their attitude. This is a very long response time in the context of the norms obtained from the experiment. It seems, therefore, that movers are uncertain about their attitudes towards quotas or perhaps do not even have attitudes towards them. Thus they are formulating their opinions during the response time. By necessity however, this thinking is perfunctory thus explaining their susceptibility to counter argumentation.

The interviewer's recorded latency times were also analyzed to identify any differences between movers and non-movers. However, it was found that the interviewer's latency scores did not replicate the significant effect revealed by the voice key latencies without special adjustments to the data. Specifically, in order to get a statistically meaningful difference between the movers and non-movers response times as recorded by the interviewer it was necessary to eliminate the erratic data. Erratic data may be defined as any response time measurement that falls outside of two standard deviations from the mean. The logic for this adjustment, as will be appreciated by those skilled in the art, is that it is possible for uninteresting events such as lapse in attention, a sneeze, or an idiosyncratic difficulty with a task, to lead to an abnormally long response time. This has the potential to shift the mean of the group disproportionally. Performing this analysis on the data reveals a difference between the non-movers and the movers that was statistically significant ($M=3.233$ and $M=4.149$ seconds respectively, $t(167)=2.96$, $P<0.005$).

While it will be appreciated by those skilled in the art that using manual timing of voice response latencies may, with appropriate statistical analysis, yield meaningful results, such manual results have a number of inherent limitations. Firstly, it requires a skilled and motivated interviewer. Secondly, it introduces a delay by the interviewer in the times recorded. Thus it provides a less pure index than the voice key of the processing time required to answer the question. However, even where manual timing is used, the voice key provides a check on the performance of the interviewers.

The data lends support to the notion that stable preferences are due principally to crystallized attitudes, at least on the matter in question, while unstable preferences result when those without such attitudes are forced to devise answers to questions on the spot. This is supported by the reaction time measures, since those with unstable preferences respond more slowly and with less reference to underlying values than those with stable preferences.

It will be appreciated by those skilled in the art of the practical utility of such response time measures. For example, the knowledge that opinions slow in coming are also likely to be poorly anchored and thus highly pliable would be very valuable information to political strategists and marketing executives as well as survey analysts.

It will be appreciated that the foregoing description relates to a preferred embodiment and that various modifications are possible. For example, in certain situations it may be desirable to provide the respondent with a list of possible answers before posing the question. This would eliminate the tendency of the respondent to analyze, for example, the first possible response as the later responses were being read to the respondent after the question has been posed. By reading the possible responses to the respondent first and then asking the question, one can more accurately measure the time the respondent devoted to a particular answer. In fact, this may be the preferred format of the questions when doing attitude survey research.

It will be appreciated by those skilled in the art that other changes are possible within the broad scope of the invention as defined in the attached claims. For example, the starting of the millisecond clock could be effected by electronic means rather than by the interviewer. The voice key, in particular, could be programmed to indicate the offset of a continuous utterance such as the reading of a question. The starting of the clock could in this manner be synchronized with the end of the question in a more exact manner than the pressing of a key by the interviewer. Of course, the initialization of the clock by the voice key would produce some invalid measurements, just as it does in the measurement of the onset of answers. Because observations have demonstrated that it is fairly easy to train an interviewer to accurately start the clock just as the last word in a question is enunciated, the preferred embodiment of the invention presented earlier does not rely on the voice key to initialize the clock.

Several factors account for the ease with which the interviewer can start the clock. First, the enunciation of the last word in a question is a relatively discrete event that is well-defined in the interviewer's mind. Moreover, the interviewer can easily anticipate uttering the last word and thus get ready to press the bar starting the clock. Finally, the interviewer retains substantial control over when the final word in the question is said. Given the trade-off between precision and invalid cases inherent in the use of the voice key, the preferred embodiment applies the voice key to the measurement of response onset, where the interviewer has little control over the initiation of the response, without applying it to the measurement of question offset, where the interviewer retains a substantial degree of control.

We claim:

1. An apparatus for use by an interviewer in conducting a survey of a person, the apparatus comprising:

(a) a means for displaying a menu of questions to be asked by the interviewer, said means for displaying including timing means and comprising a computer having a central processing unit, a disk drive, a data entry keyboard and a video display unit, and said computer including means for providing question prompts to the interviewer asking questions of the person being surveyed, by displaying said question prompts on the video display unit;

(b) a means for initiating said timing means upon completion of the question, said means for initiating being coupled to said means for displaying, and said means for displaying being responsive to said means for initiating;

(c) a means for detecting an audio response from the person being surveyed, and converting said audio response into an electronic control signal which stops the timing means, said means for detecting and converting being coupled to said means for displaying;

(d) said means for initiating said timing means upon completion of said question being responsive to a manual input from the interviewer and an electronically activated input for generating a control signal for initiating said timing means in response to one of said manual and electronic activated inputs; and (e) said means for displaying, determining and recording a response time of the person being surveyed being based on the initiating and stopping of said timing means.

2. An apparatus as claimed in claim 1 wherein said means for detecting and converting the first audio response further includes means to control the display of the response time on the video display unit.

3. An apparatus as claimed in claim 1 wherein said means for converting the first audio response comprises an electronic circuit which includes a means to convert an audio signal into an electronic signal which electronic signal then causes a reading to be taken from the timing means to measure and record the response time.

4. An apparatus as claimed in claim 1 wherein said means for initiating said timing means upon completion of the question comprises an electronic trigger signal emanating from an audio signal sensor.

5. An apparatus as claimed in claim 1 wherein the electronic control signal which stops said timing means is a manual input.

6. An apparatus as claimed in claim 1 wherein said means for initiating said timing means is responsive to both of said manual input and said electronically activated input.

* * * * *